(12) United States Patent
Chahal

(10) Patent No.: US 8,701,181 B2
(45) Date of Patent: *Apr. 15, 2014

(54) METHODS AND SYSTEMS FOR PREVENTING SECURITY BREACHES

(75) Inventor: Vishal Chahal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,926

(22) Filed: May 28, 2012

(65) Prior Publication Data

US 2012/0240222 A1    Sep. 20, 2012

Related U.S. Application Data

(63) Continuation of application No. 11/938,181, filed on Nov. 9, 2007, now Pat. No. 8,245,289.

(51) Int. Cl.
*H04L 29/06* (2006.01)

(52) U.S. Cl.
USPC ............................................... 726/17; 726/21

(58) Field of Classification Search
None
See application file for complete search history.

(56) References Cited

U.S. PATENT DOCUMENTS

| | | | |
|---|---|---|---|
| 5,974,549 A | 10/1999 | Golan | |
| 6,167,520 A | 12/2000 | Touboul | |
| 6,272,636 B1 * | 8/2001 | Neville et al. | 713/189 |
| 6,275,938 B1 | 8/2001 | Bond et al. | |
| 6,308,274 B1 | 10/2001 | Swift | |
| 6,728,964 B1 | 4/2004 | Butt | |
| 6,976,174 B2 * | 12/2005 | Terrell et al. | 726/22 |
| 8,347,392 B2 * | 1/2013 | Chess et al. | 726/25 |
| 2004/0034794 A1 * | 2/2004 | Mayer et al. | 713/200 |
| 2006/0031937 A1 | 2/2006 | Steinberg | |
| 2007/0234070 A1 * | 10/2007 | Horning et al. | 713/190 |
| 2008/0016314 A1 * | 1/2008 | Li et al. | 711/200 |

FOREIGN PATENT DOCUMENTS

EP    1643409 A2    4/2006

\* cited by examiner

*Primary Examiner* — Gilberto Barron, Jr.
*Assistant Examiner* — Abdulhakim Nobahar
(74) *Attorney, Agent, or Firm* — Elissa Wang (57) ABSTRACT

A security payload is attached to a received binary executable file. The security payload is adapted to intercept application programming interface (API) calls to system resources from the binary executable file via export address redirection back to the security payload. Upon execution of the binary executable file, the security payload replaces system library export addresses within a process address space for the binary executable file with security monitoring stub addresses to the security payload. Upon the binary executable computer file issuing a call to a given API, the process address space directs the call to the given API back to the security payload via one of the security monitoring stub addresses that is associated with the given API. The security payload then can assess whether the call to the given API is a security breach.

18 Claims, 7 Drawing Sheets

METHODS AND SYSTEMS FOR PREVENTING SECURITY BREACHES

RELATED APPLICATIONS

The present patent application is a continuation of the patent application of the same title and having the same inventors, filed on Nov. 9, 2007, and assigned application Ser. No. 11/938,181.

FIELD OF THE INVENTION

The present invention relates to preventing security breaches resulting from malicious binary executable files. More particularly, the present invention relates to such prevention by attaching security payload software to the binary executable files, where the security payload software intercepts application programming interface (API) calls to system resources via export address redirection.

BACKGROUND OF THE INVENTION

Preventing security breaches within computing systems has become of paramount importance with the increasing interconnection of computing systems via the Internet and other networks. Viruses, Trojan horses, worms, and other types of malicious software can infect computing systems, causing them to perform inefficiently and/or maliciously. Such malicious software is often received through web-browsing programs when browsing web sites on the Internet, through email programs when receiving new email, and through instant messaging programs when receiving new instant messages (i.e., with the software being received as a file attachment to an instant message), among other ways.

Existing approaches to preventing security breaches typically focus on detecting whether malicious software has been received while performing the activities indicated in the previous paragraph. For example, fingerprinting or signature-detecting techniques examine computer program code, or software, that has been received and compares it to hexadecimal fingerprints or signatures to determine whether the computer program software is infected with any malicious elements (i.e., malicious software), thereby making the computer program software malicious and vulnerable. However, such techniques can only detect known malicious software, and not new malicious software, requiring continual updating of the fingerprint or signature database to be effective.

Another example is a heuristic approach, which attempts to detect whether computer program software that has been received is infected with any malicious software by scrutinizing various aspects of the software, and determining the likelihood that the computer program software has been infected with malicious software. This approach can be relatively slow, and results in decreasing the performance of a computing system. Furthermore, the heuristic approach can yield false negatives (indicating that computer program software is not infected with malicious software when in fact it is) or false positives (indicating that computer program software is infected with malicious software when in fact it is not).

A third example is an integrity-checking approach, which compares a calculated checksum of computer program software that has been received against a known checksum for the software. If the calculated checksum disagrees with the known checksum, then it is concluded that the computer program software has been modified, potentially due to infection with malicious software. However, integrity checking presumes that a known checksum is available for the computer program software in question, which is not always the case. There is therefore a need to ameliorate one or more of the above mentioned disadvantages associated with the prior art.

SUMMARY OF THE INVENTION

Disclosed is a method for preventing security breaches that may be present within binary executable electronic files. Accordingly, the method includes receiving a binary executable electronic file. Security payload software is attached to the binary executable electronic file. The security payload software is adapted to intercept application programming interface (API) calls to system resources from the binary executable electronic file, via export address redirection back to the security payload software.

Upon execution of the binary executable electronic file, the security payload software replaces system library export addresses within a process address space for the binary executable electronic file with security monitoring stub addresses to the security payload software. The API calls are associated with the system library export addresses within the process address space.

Upon the binary executable electronic file issuing a call to a given API, the process address space directs the call to the given API back to the security payload software via one of the security monitoring stub addresses that is associated with the given API. The security payload software assesses whether the call to the given API is a security breach. That is, the security payload software assesses whether the call to the given API represents a security breach. Where the call to the given API is not a security breach, the call is passed through to the given API to the system resources. However, where the call to the given API is a security breach, one or more security breach-related actions are performed.

An article of manufacture of an embodiment of the invention includes a tangible computer-readable medium, such as a recordable data storage medium, or another type of tangible computer-readable medium. The medium includes a means, which may be one or more computer programs stored on the medium. The means is for adding security payload software to a binary executable electronic file, by attaching the software to the file. The security payload software is adapted to intercept application programming interface (API) calls to system resources from the binary executable electronic file via export address redirection back to the security payload software. Upon execution of the binary executable electronic file, the security payload software replaces system library export addresses within a process address space for the binary executable electronic file with security monitoring stub addresses to the security payload software. The API calls are associated with the system library export addresses within the process address space.

A system of an embodiment of the invention includes hardware, application software running on the hardware, and plug-in software for the application software and that also runs on the hardware. The application software is adapted to receive a binary executable electronic file. The plug-in software is adapted to attach security payload software to the binary executable electronic file. The security payload software is adapted to intercept application programming interface (API) calls to system resources from the binary executable electronic file via export address redirection back to the security payload software. Upon execution of the binary executable electronic file, the security payload software replaces system library export addresses within a process address space for the binary executable electronic file with security monitoring stub addresses to the security payload software. The API calls are associated with the system library export addresses within the process address space.

Embodiments of the invention provide for advantages over the prior art. Any binary executable electronic file that is received by a computing system can be trusted, since attaching the security payload software to each such electronic file ensures that the electronic file does not perform maliciously when executed. Security can be enhanced or modified by changing security-related policies against which calls to API's are assessed. As such, no regular updates are necessarily needed to ensure protection against current and future malicious software. The user may be able to select to which binary executable electronic files the security payload software is attached, to selectively enhance security of the computing system in question.

Furthermore, the security payload software is itself resistant from infection by a virus or other malicious software, insofar as the software is attached to a binary executable electronic file statically, prior to execution of the file. The security payload computer software does not run or exist as a computer program on a computing system for a virus to infect, except when a binary executable electronic file to which it has been attached is running—and even then, the software runs as part of such a binary executable electronic file. The security payload computer software can be lightweight in nature, in that it consumes minimal memory and requires minimal system resources, such that embodiments of the invention can be implemented in conjunction with other security measures.

In addition, once a binary executable electronic file has been statically patched with security payload software, the file can be distributed around a given network of systems without requiring re-patching at each computing system. By comparison, virus-scanning security techniques typically scan each file upon entry to a computing system, which means that multiple systems may scan a given file even though one of the systems has already determined that the file poses no malicious threat. Finally, the security payload software attachment process is reversible, such that the security payload software can be removed from a binary executable electronic file at any time.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
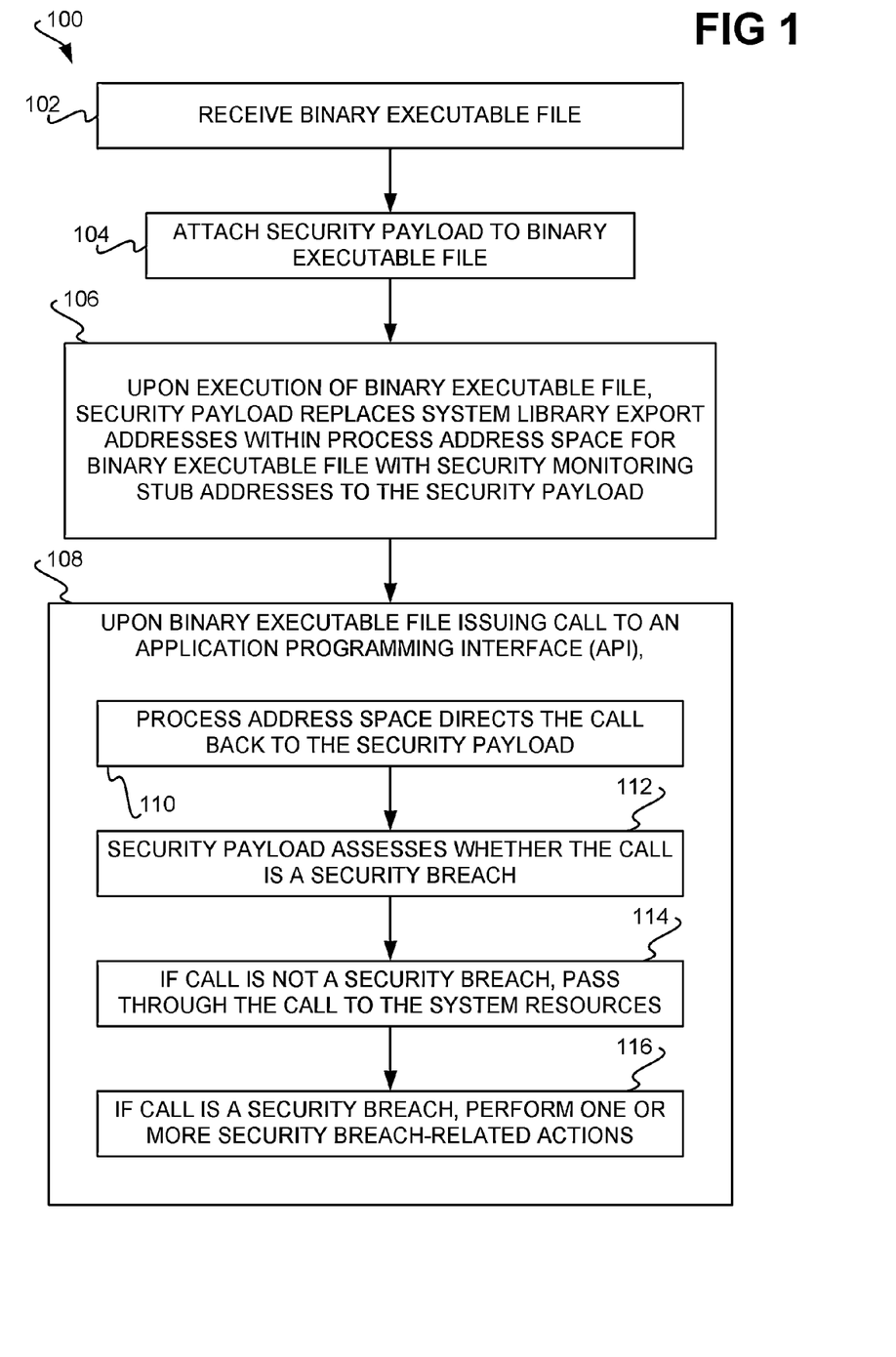
FIG. 1 is a flowchart of a method for detecting security breaches resulting from binary executable electronic files, according to an embodiment of the invention.

FIG. 1 shows a method 100, according to an embodiment of the invention. A binary executable electronic file is received (102). The electronic file is an executable electronic file in that it is directly executable by a computing system, and does not have to be compiled, for instance, prior to execution. Likewise, the electronic file is a binary electronic file in that it is not a source or object electronic file, which typically have to be compiled prior to execution. The binary executable electronic file may be received by an application computer program running on a computing system, such as an email program, a web-browsing program, an instant-messaging program, or another type of computer program. The binary executable electronic file may be received from a source external to the computing system, such as a server or other computing system to which the computing system is interconnected via one or more networks, such as or including the Internet.

Security payload code, or software, is attached to the binary executable computer code, or software (104). As is described in more detail later in the detailed description, the security payload software is adapted to intercept application programming interface (API) calls to system resources from the binary executable electronic file via export address redirection back to the security payload software. In one embodiment, a plug-in computer program (i.e., plug-in software) may attach the security payload software to the binary executable computer software. The plug-in computer program may be designed for "plugging in" to the application any computer programs (i.e., any such software) that originally received the binary executable electronic file. A plug-in computer program can be defined generally and non-restrictively as an auxiliary computer program that works with another computer program, such as an application computer program (i.e., application software), to enhance the capability of the application computer program. It is noted first that attachment of the security payload software to the binary executable electronic file is performed statically, prior to the binary executable electronic file having been executed. It is also noted that the attachment performed in part 104 of the method 100 can include first mapping the binary executable electronic file to the virtual memory of the computing system or device on which the method 100 is being performed. Such mapping to virtual memory permits the binary executable electronic file to be provided in a portable executable (PE) format within virtual memory so that a payload can be attached, as can be appreciated by those of ordinary skill within the art.

Furthermore, it is noted that after attachment of the security payload software to the binary executable electronic file, the binary executable electronic file still is a valid binary executable electronic file—such as a binary PE electronic file—and is still capable of being executed. In general, expanding a binary executable file, such as by attaching security payload software thereto, can be problematic. The binary executable file may become invalid according to the PE file format, for instance, or even if it remains valid, the file may not be capable of being executed any longer. By comparison and in contradistinction, in part 104, attachment of the security payload software to the binary executable electronic file does not render the file invalid, and the file is still capable of being executed.

Figure 2:
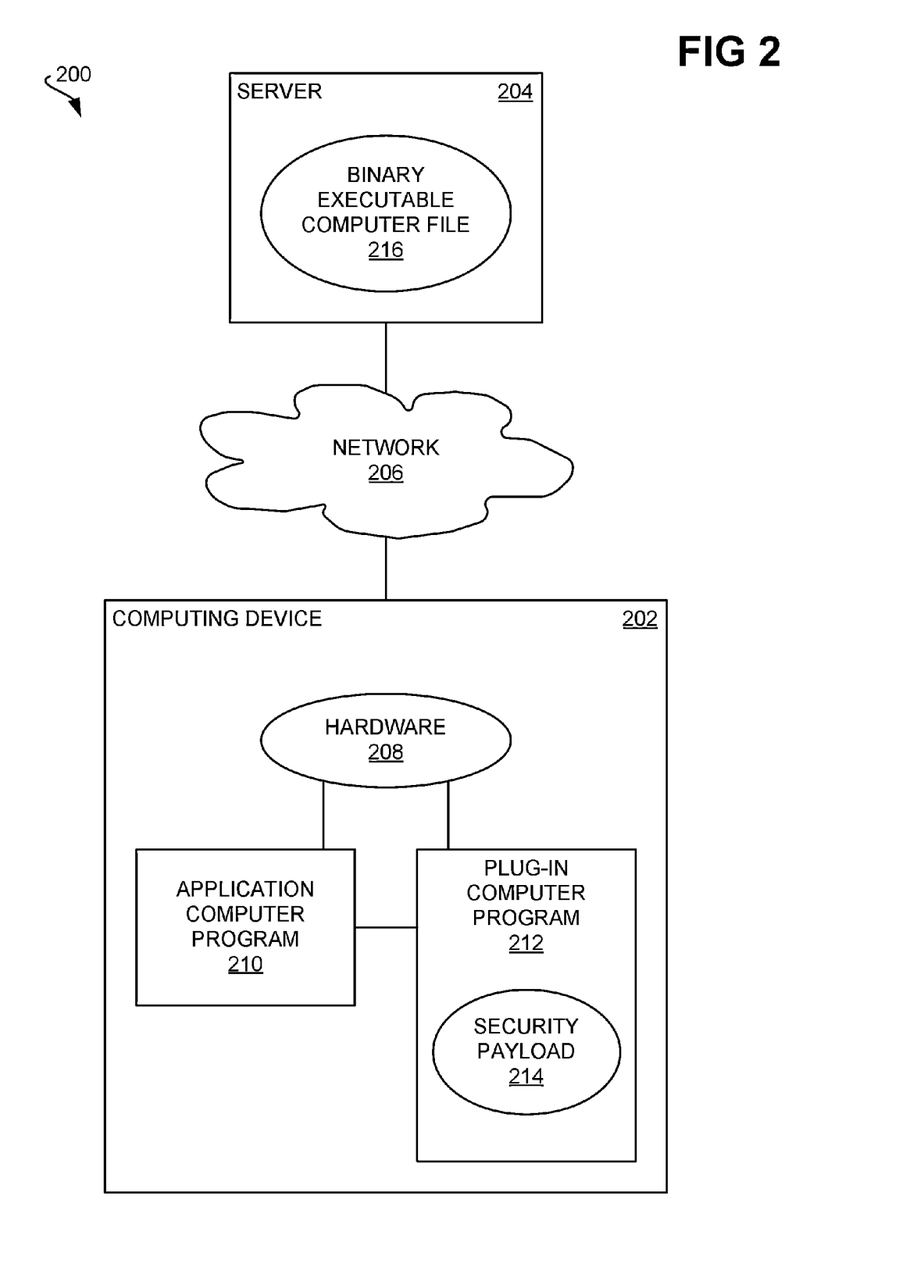
FIG. 2 is a diagram of a computing system in relation to which the method of FIG. 1 can be performed, according to an embodiment of the invention.

FIG. 2 shows a representative system 200 in relation to which the method 100 can be performed, according to an embodiment of the invention. The system 200 includes a computing device 202 and a server 204 interconnected via a network 206, which may be or include local-area networks (LAN's), wide-area networks (WAN's), the Internet, intranets, extranets, and other types of networks. Although just the computing device 202 and the server 204 are depicted as being communicatively connected to the network 206, in actuality many more such devices may be connected to the network 206.

The computing device 202 may be a desktop computer, a laptop computer, a personal digital assistant, a mobile phone, or any other types of electronic computing device. The computing device 202 is depicted in FIG. 2 as including hardware 208 on which an application computer program 210 and a plug-in computer program 212 are running The hardware 208 may include processors, memory, storage devices, peripheral devices, input/output (I/O) devices, network adapters, and/or other types of hardware. Furthermore, other software, in addition to and/or in lieu of the programs 212 and 212, may be running on the hardware 208 of the computing device 202, such as operating systems, device drivers, and/or other types of computer programs.

For exemplary purposes, the server 204 is described as being an email server, but it may also be an instant-messaging server, a web server, another type of server, or another type of computing device. Importantly, the server 204 has stored thereon a binary executable electronic file 216 that is received by the computing device 202. For example, the application computer program 210 may be an email computer program that receives the executable electronic file 216 as part of an email, within part 102 of the method 100 of FIG. 1. In response, the plug-in computer program 212 attaches the security payload software 214 to the executable electronic file 216, within part 104 of the method 100 of FIG. 1.

Figure 3A:
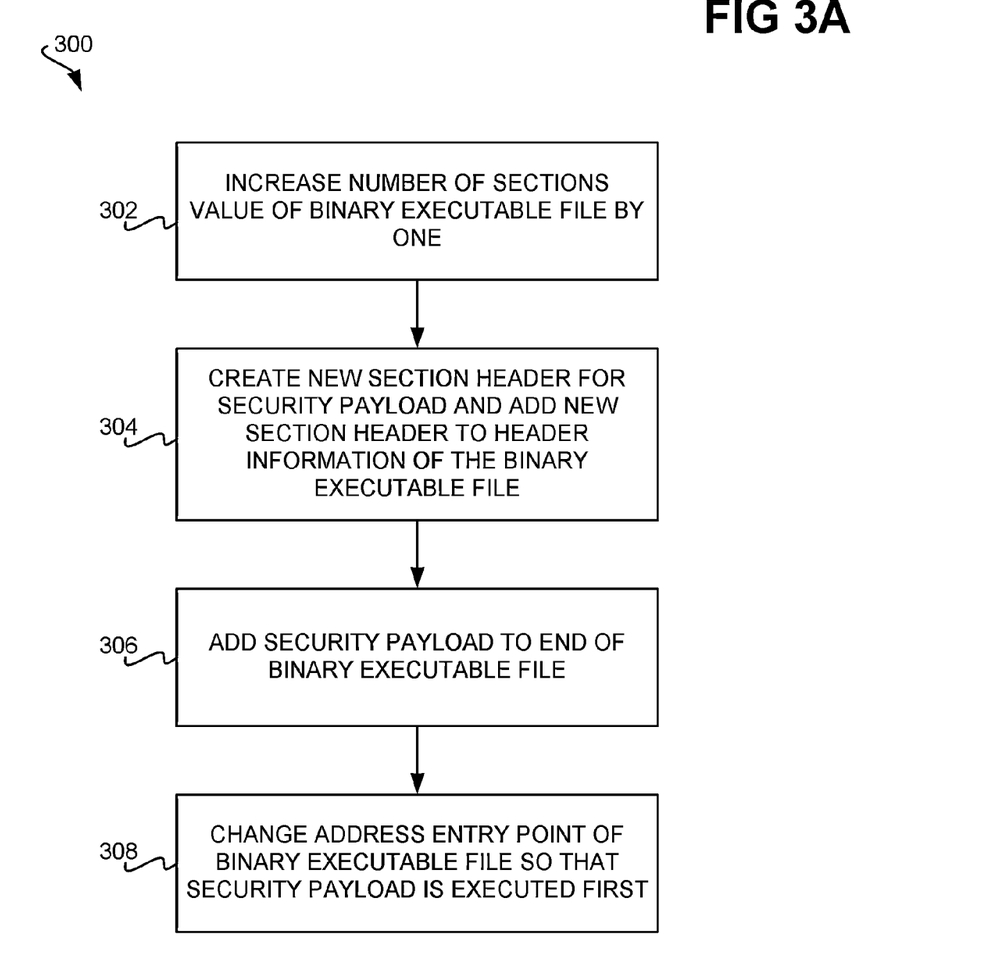
FIG. 3A is a flowchart of a method that can implement parts of the method of FIG. 1, according to an embodiment of the invention.

FIG. 3A shows a method 300 that can implement attachment of security payload software to a binary executable electronic file in part 104 of the method 100, according to an embodiment of the invention. The method 300 is described in exemplary but non-restrictive relation to the binary executable electronic file 350 of FIG. 3B. The method 300 first increases the number-of-sections value of the binary executable electronic file by one (302), as indicated by the letter A in FIG. 3B. Thus, the IMAGE_FILE_HEADER section of the binary executable electronic file is updated so that its number-of-sections value is increased by one to accommodate the security payload software as a new section within the binary executable electronic file.

Figure 3B:
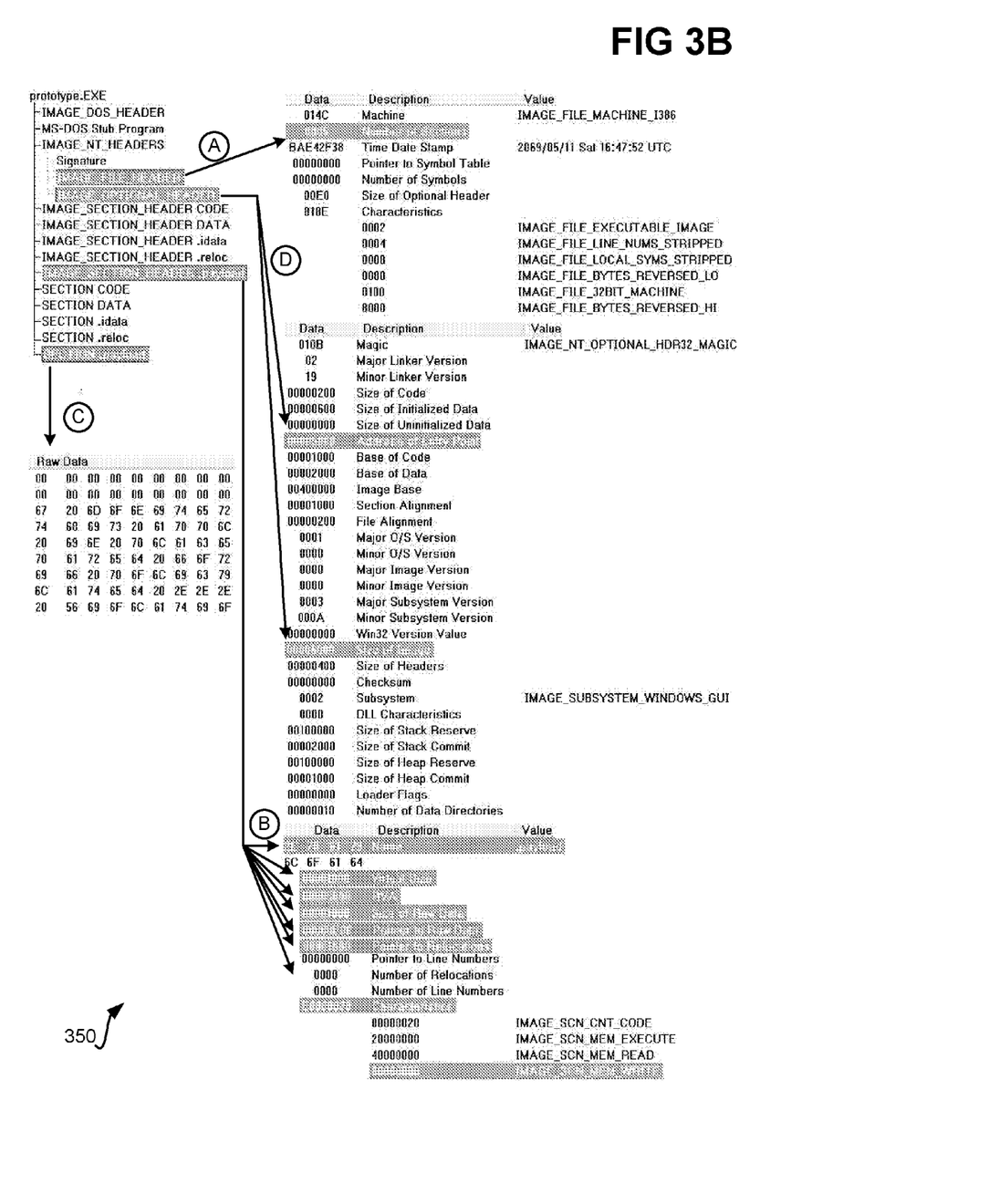
FIG. 3B is a diagram of representative software in relation to which the method of FIG. 3A has been exemplarily performed, according to an embodiment of the invention.

Next, the method 300 creates a new section header for the security payload software and adds the new section to the header information of the binary executable electronic file (304), as indicated by the letter B in FIG. 3B. For example, a new IMAGE_SECTION_HEADER is created for the security payload software, and is named, such as ".payload", within the header information of the binary executable electronic file. This section header is added after the headers for the existing sections of the binary executable electronic file, and before the raw data for the first such section.

This new section header acts as the header information for the new section containing the security payload software, and has data that is used by the system loader process to ascertain the size, characteristics, and location relative to the other section headers. As such, the security payload software can be loaded and processed within the virtual memory space (i.e., the process address space for the binary executable electronic file) at runtime.

Several particular elements of this new section header can be populated with values. A characteristic of the new section indicates that the security payload software is writeable during execution. This characteristic can render the header unique as to the other software sections of the binary executable electronic file, which may not be writeable during execution. In one embodiment, the security payload software stores the replaced system library export addresses within its own software, such that the software has to be writeable in order to store these addresses at runtime, as is described in more detail later in the detailed description.

Second, a SizeOfRawData of the new section is populated with the value of the security payload software as stored on a storage device, such as a hard disk drive. The SizeOfRawData value may be a multiple of a FileAlignment value, and can be larger or smaller than the VirtualSize value, as described in the next paragraph, which is not rounded up. The FileAlignment value is specifically the minimum granularity of segments, or "chunks," of information within the binary executable file. The SizeOfRawData value may be determined as $$\frac{SecurityPayloadSize + FileAlignment - 1}{SectionAlignment} \times SectionAlignment,$$

where SecurityPayloadSize is the actual size of the security payload software, and SectionAlignment is the minimum amount of space a section of an executable binary file can occupy when loaded in memory.

Third, a VirtualSize of the new section is populated with the total size of the new section within virtual memory. The VirtualSize is aligned to the SectionAlignment value within IMAGE_OPTIONAL_HEADER. Its value can be determined as $$\frac{SizeOfRawData + SectionAlignment - 1}{SectionAlignment} \times SectionAlignment.$$

Fourth, the PointerToRawData of the new section is the fill offset for the new section, and is aligned according to the FileAlignment value within IMAGE_OPTIONAL_HEADER. If the Prev_PointerToRawData is the PointerToRawData of the section before the address of the location where the security payload is added to the binary executable electronic file, and if Prev_SizeOfRawData is the SizeOfRawData of this prior section, then $$PointerToRawData = \\ Prev\_PointerToRawData + \\ \frac{Prev\_SizeOfRawData + FileAlignment - 1}{FileAlignment} \times FileAlignment.$$

Finally, the VirtualAddress of the new section is a relative virtual address, offset from ImageBase in IMAGE_OPTIONAL_HEADER and is aligned to the SectionAlignment value within IMAGE_OPTIONAL_HEADER. If Prev_VirtualAddress is the VirtualAddress of the section before the address of the location where the security payload is to added to the binary executable electronic file, and if Prev_VirtualSize is the VirtualSize of this prior section, then $$VirtualAddress = \\ \frac{Prev\_VirtualAddress + Prev\_VirtualSize + SectionAlignment - 1}{SectionAlignment} \times \\ SectionAlignment.$$

It is noted that the original address of the entry point to the binary executable file within the IMAGE_OPTIONAL_HEADER is stored within the Pointer to Relocations value of the new section header added for the security payload software being added.

Next, the method 300 adds the security payload software to the end of the binary executable electronic file (306), as indicated by the letter C in FIG. 3B. Finally, the address of the entry point of the binary executable electronic file is modified so that the security payload software is executed first when the binary executable electronic file is executed (308), as indicated by the letter D in FIG. 3B. This address is referred to as the address entry point herein. The value of the address entry point is changed to be equal to the VirtualAddress determined for the new section created in part 304. As such, the security payload software is launched before any other software of the binary executable electronic file starts execution, which permits the security payload software to hook into the system library export addresses, as is described in more detail later in the detailed description.

It is noted that the SizeOfImage value within IMAGE_OPTIONAL_HEADER may also be changed in part 306. In particular, this value is adjusted to take into account the increase of the size of the binary executable electronic file due to the new section having the security payload software being attached to or embedded within the binary executable electronic file. The SizeOfImage value is determined by dividing the SizeOfRawData by 4,000, which is the default size of memory pages, and round it up to the nearest multiple SectionAlignment value.

Referring back to FIG. 1, at some point the binary executable electronic file is executed, or run. Upon such execution of the binary executable electronic file, the security payload software replaces system library export addresses within the process address space for the binary executable electronic file with security monitoring stub addresses back to the security payload software (106). The process address space is the address space, such as the virtual address space, of the computing system or device that has been assigned to the binary executable electronic file for execution of the file.

The system library export addresses are encompassed by a system library, such as a dynamically linked library (DLL) in one embodiment. The addresses are exported to the process address space at time of execution of the binary executable electronic file. Thus, when the binary executable electronic file is executed, calls to API's within the system library are routed through the system library export addresses. Replacing these system library export addresses with security monitoring stub addresses means that API calls are first routed to the security payload software, so that the security payload software can initially determine whether the API calls pose security threats, as will be described in more detail later in the detailed description. It is noted that part 106 is performed dynamically, at runtime of the binary executable electronic file.

Figure 4:
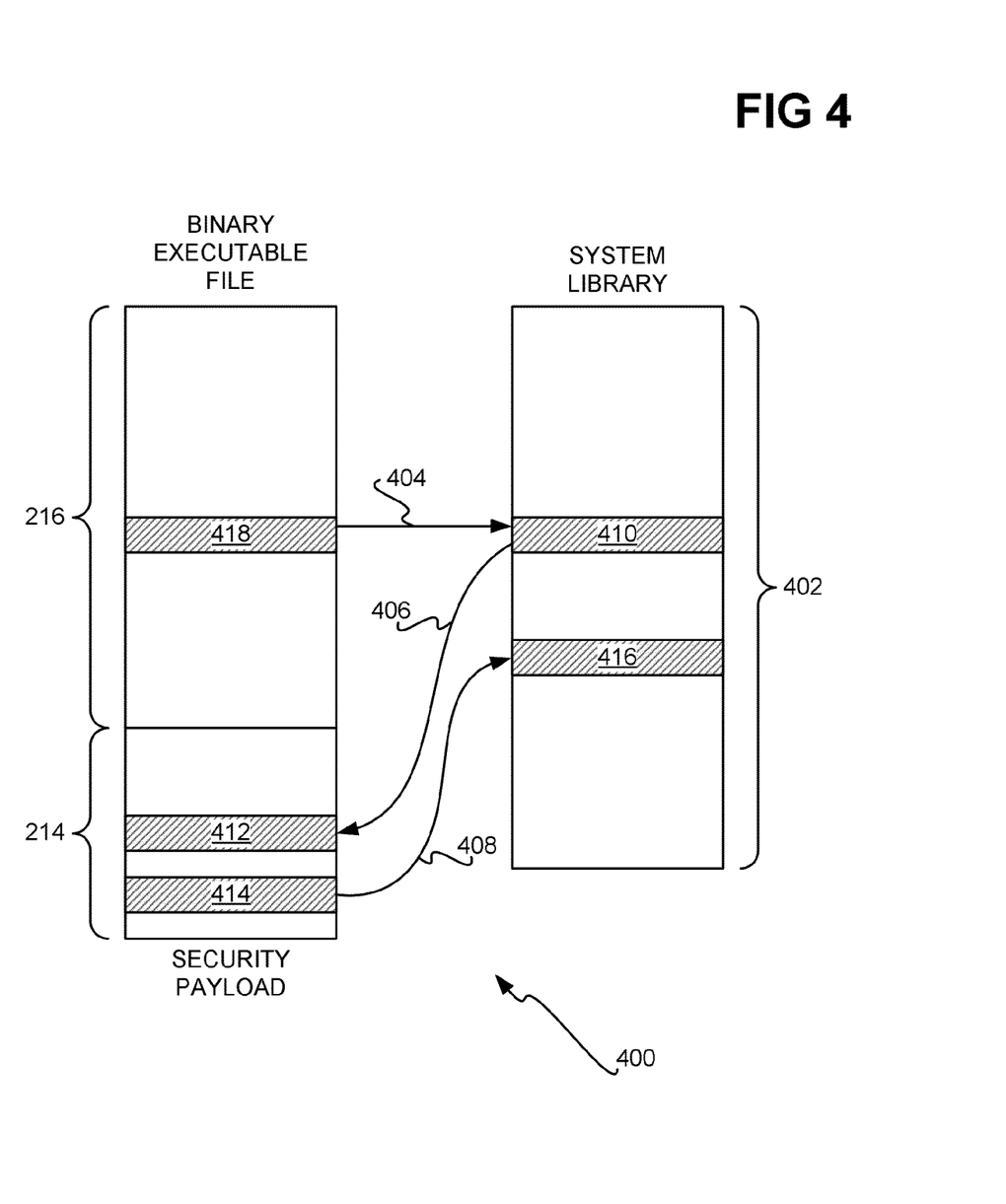
FIG. 4 is a diagram illustrating representative performance of parts of the method of FIG. 1, according to an embodiment of the invention.

FIG. 4 illustratively depicts how system library export addresses within the process address space are replaced with security monitoring stub addresses, according to an embodiment of the invention. The process address space 216 for the binary executable electronic file 216 includes binary executable electronic file 216, as well as the security payload software 214 that has been attached to the executable electronic file 216. Furthermore, the process address space 216 includes the system library 402, to which API calls from the binary executable electronic file 216 are resolved.

Thus, computer program software 214 within the binary executable electronic file 216 may make a given API call to the system library 402, as indicated by the arrow 404. Normally, the space 410 within the system library 402 would be occupied by a system library export address that, for instance, redirects the API call to software 416 within the system library 402, where the software 416 implements the function of this API call. However, the space 410 has instead been replaced by a security monitoring stub address that redirects the API call to software 412 within the security payload software 412, as indicated by the arrow 406.

The original system library export address is stored within the space 414 of the security payload software 214. Only if the API call does not pose a security threat does the security payload software 214 then direct the API call back to the software 416, as indicated by the arrow 408, by virtue of the original system library export address having been stored within the space 414 of the security payload software 214. Thus, for each system library export address within the address space 400 for the binary executable electronic file 216 occupied by the system library 402, the system library export address is stored within the security payload software 214. The system library export address within the system library 402 is then replaced by a security monitoring stub address that redirects the API call of (i.e., associated with) this export address to the security payload software 214 for processing. As such, the binary executable electronic file 216 issuing this API call results in control first passing to the security payload software 214 for security threat checking.

Figure 5:
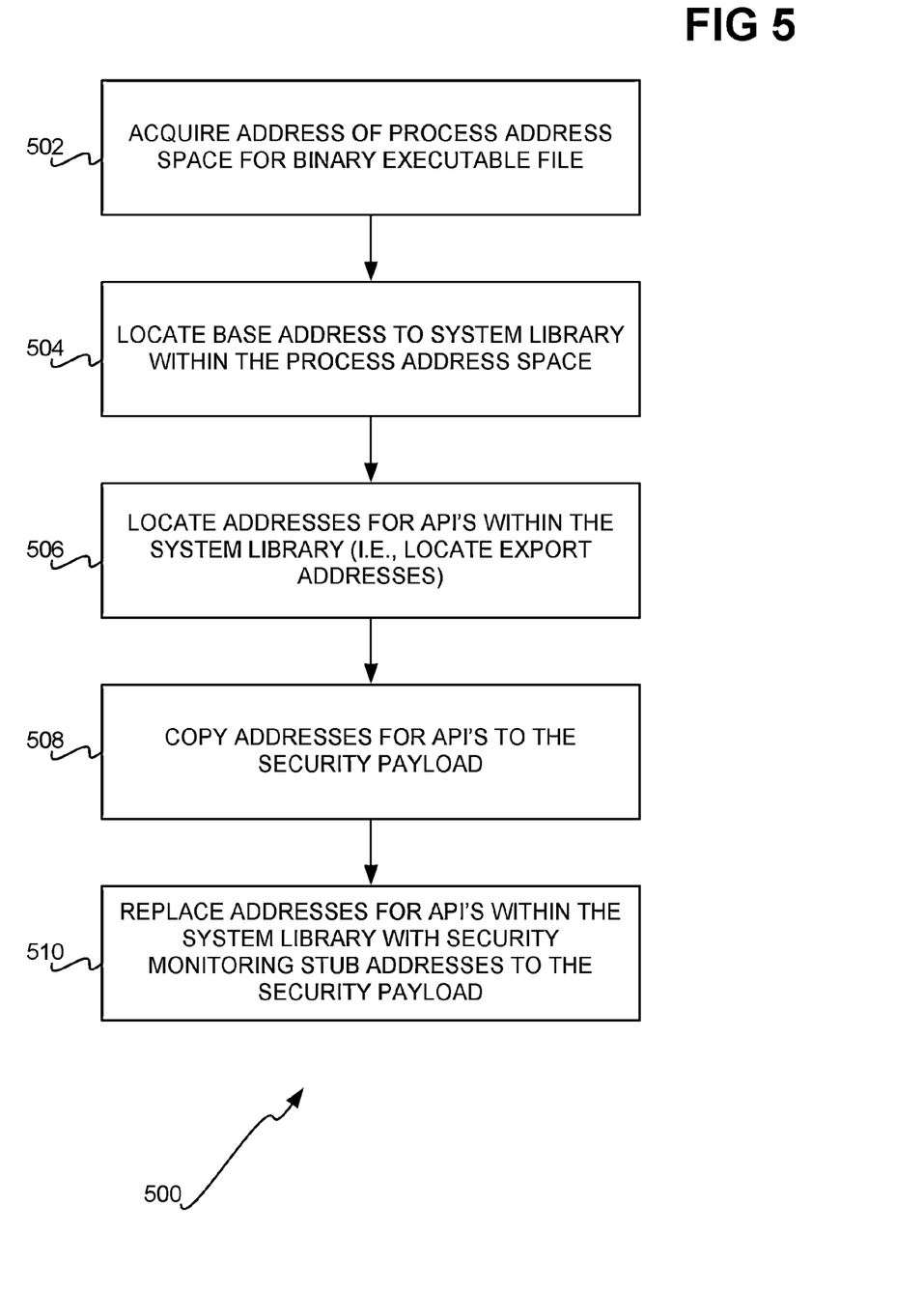
FIG. 5 is a flowchart of a method that can implement parts of the method of FIG. 1, according to an embodiment of the invention.

FIG. 5 shows a method 500 that can implement replacement of system library export addresses within the process address space for a binary executable electronic file with security monitoring stub addresses to security payload software in part 106 of the method 100, according to an embodiment of the invention. The address at which the process address space for the binary executable electronic file starts is acquired (502), and the base address to the system library within this process address space is located (504). The addresses for all the API's within the system library are located (506). Such addresses are the export addresses that have been described.

These export addresses for the API's are copied to the security payload software (508). The export addresses within the system library are then replaced with security monitoring stub addresses to the security payload software (510). As such, a call to a given API by the binary executable electronic file results in actuality resolves to one of the security monitoring stub addresses at the location at which the export address for this API was previously located within the system library. Therefore, control passes to the security payload software, which can determine whether the API call represents a security threat in deciding whether to allow the API call to continue to the export address associated with the API, and as stored within the security payload software itself.

Referring back to FIG. 1, at some point during the execution of the binary executable electronic file, the binary executable electronic file issues a call to an API of the system library (108). As has been described, the process address space occupied by the system library directs the call back to the security payload software (110), via a security monitoring address having replaced the export address for this API. The security payload software then assesses whether the API call is a security breach or not (112).

In one embodiment, the security payload software assesses whether the API call is a security breach by analyzing the API against one or more predetermined security-related policies. Such policies can include policies represent direct information leakage, indirect information leakage, information tampering, direct resource abuse, and/or indirect resource abuse, among other types of security-related policies. Direct information leakage includes reading local files and emails, which the computer executable file may be prohibited from doing. Indirect information leakage includes changing file permissions, copying local files to remote locations, and so on, which the computer executable file may also be prohibited from doing.

Information tampering includes updating a profile file of a user within a home directory, modifying critical system settings, such as startup settings, and modifying the logic of other executable files, scripts, and macros, which the computer executable file may be prohibited from doing. Direct resource abuse includes writing a large file to a directory, crashing another process, attempting to format hard disk drives, as well as performing other operations from which recovery may not be able to be achieved, all of which the computer executable file may be prohibited from doing. Indirect resource abuse can include downloading remote software, placing software within a startup folder of the system, updating the startup script of the system, as well as scripting email and instant-messaging clients to send content, which the computer executable file may also be prohibited from doing.

If the API call that resulted in redirection to the security payload software does not represent a security breach, then the security payload software passes through the API call back to the system resources in question (114). Because the security payload software has stored the export addresses for the API calls, it can thus pass the API call back through to the system library if the API call does not represent a security breach. By comparison, if the API call does represent a security breach, the security payload software may perform one or more security breach-related actions (116). Such actions include suspending execution of the binary executable electronic file until the user is informed and approves the API call, simply terminating execution of the binary executable electronic file, and so on, among other types of security breach-related actions.

Figure 6:
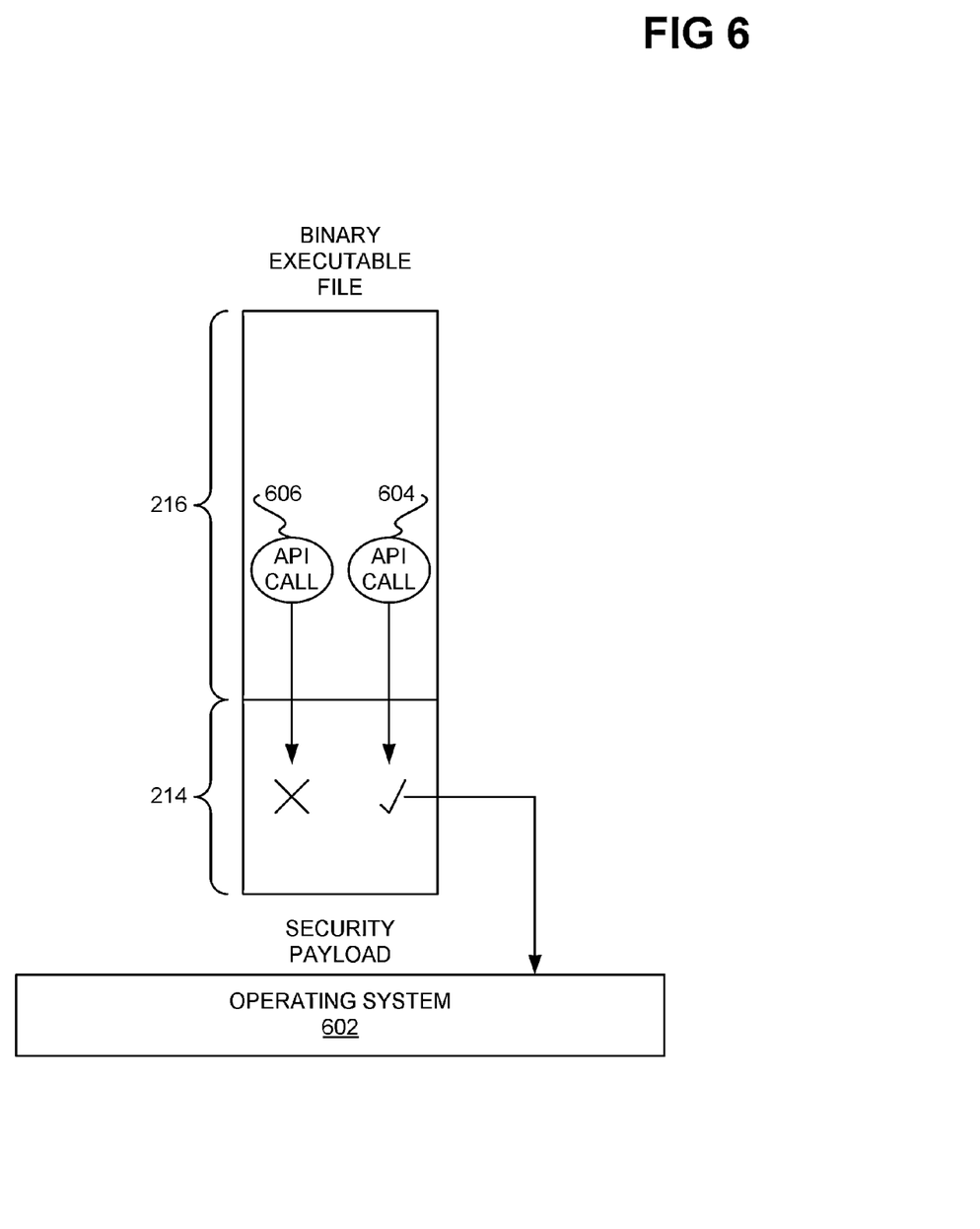
FIG. 6 is a diagram illustrative representative performance of parts of the method of FIG. 5, according to an embodiment of the invention.

FIG. 6 illustratively depicts performance of part 108 of the method 100, according to an embodiment of the invention. The system resources (i.e., the system library) in FIG. 6 are exemplified by an operating system 602 to which API calls can be made. The binary executable electronic file 216 upon execution may make a first API call 604. By virtue of the system library export addresses having been replaced by security monitoring stub addresses within the process address space for the binary executable electronic file 216, the API call 604 is intercepted by the security payload software 214 that has been attached to the binary executable electronic file 216. The security payload software 214 may determine that the API call 604 does not represent a security risk, and therefore passes the API call 604 to the operating system 602 at the system library export address originally specified and that has been stored within the security payload software 214.

Thereafter, the binary executable electronic file 216 may issue a second API call 606. As before, by virtue of the system library export addresses having been replaced by security monitoring stub addresses within the process address space for the binary executable electronic file 216, the API call 606 is also intercepted by the security payload software 214 that has been attached to the binary executable electronic file 216. In this case, however, the security payload software 216 may determine that the API call 606 represents a security risk. Therefore, the API call 606 is not allowed to pass to the operating system 602 at the system library export address originally specified and that has been stored within the security payload software 214. Rather, the security payload software 214 performs one or more security breach-related actions, as has been described.

Embodiments of the invention provide for advantages over the prior art, as has been described in the summary section above. Furthermore, embodiments of the invention add new executable software and functionality in the form of the security payload software, and all this new software to be embedded and attached to a binary executable electronic file, without having to recompile the binary executable electronic file. There is no change to the original binary executable electronic file or its functionality. Because patching of the binary executable electronic file is performed statically, prior to its executing, once the binary executable electronic file has had the security payload software attached thereto, the resulting file can be transferred among different computing devices without loss of security, and without the file having to be repatched at each such device.

Finally, import tables of the binary executable electronic file do not have to be, and are not, modified to ensure security via API call monitoring, since instead the export addresses of system resources are modified. A separate monitoring program that has to be continually run on the computing device in question also does not have to be provided, insofar as security payload software is attached to each binary executable electronic file and is executed just when the file to which it is attached is executed. It is therefore noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. It is manifestly intended that this invention be limited only by the claims and equivalents thereof.

I claim:

1. A method for improving security of a binary executable file by using a security payload, the method comprising:

receiving the binary executable file;

attaching the security payload to the binary executable file, including changing an address entry point of the binary executable file so that the security payload is executed first upon execution of the binary executable file, the security payload adapted to intercept application programming interface (API) calls to system resources from the binary executable file via export address redirection back to the security payload; and, upon execution of the binary executable file,
the security payload replacing system library export addresses within a process address space for the binary executable computer file with security monitoring stub addresses to the security payload, the API calls associated with the system library export addresses within the process address space, wherein attaching the security payload to the binary executable file comprises:
increasing a number of sections value of the binary executable file to accommodate the security payload embedded within the binary executable file;
creating a new section header for the security payload and adding the new section header to header information of the binary executable file; and
adding the security payload to the binary executable file.

2. The method of claim 1, further comprising, upon the binary executable file issuing the call to the given API:
upon the binary executable file issuing a call to a given API, the process address space directing the call to the given API back to the security payload via one of the security monitoring stub addresses that is associated with the given API; and,
the security payload assessing whether the call to the given API is a security breach.

3. The method of claim 2, further comprising upon the binary executable file issuing the call to the given API:
where the call to the given API is not a security breach, passing through the call to the given API to the system resources; and,
where the call to the given API is a security breach, performing one or more security breach-related actions.

4. The method of claim 1, wherein attaching the security payload to the binary executable file is such that the binary executable file remains a valid binary executable file that is capable of being executed even after the security payload has been attached to the binary executable file.

5. The method of claim 1, wherein attaching the security payload to the binary executable file further comprises initially mapping the binary executable file to virtual memory of a system in relation to which the method is performed.

6. The method of claim 1, wherein receiving the binary executable file is performed by a first computer program running on a system in relation to which the method is performed, and attaching the security payload to the binary executable file is performed by a second computer program that is a plug-in computer program for the first computer program.

7. The method of claim 1, wherein attaching the security payload to the binary executable file is performed statically, prior to execution of the binary executable file.

8. The method of claim 1, wherein the security payload replacing the system library export addresses within the process address space for the binary executable file with the security monitoring stub addresses to the security payload is performed dynamically, at time of execution of the binary executable file.

9. The method of claim 1, wherein the security payload assessing whether the call to the given API is a security breach comprises the security payload analyzing the call to the given API against one or more predetermined security-related policies.

10. A non-transitory computer-readable data storage medium storing a computer program executable by a processor to perform a method for improving security of a binary executable file by using a security payload, the method comprising:
receiving the binary executable file;
attaching the security payload to the binary executable file, the security payload adapted to intercept application programming interface (API) calls to system resources from the binary executable file via export address redirection back to the security payload; and,
upon execution of the binary executable file,
the security payload replacing system library export addresses within a process address space for the binary executable computer file with security monitoring stub addresses to the security payload, the API calls associated with the system library export addresses within the process address space,
wherein the security payload replacing the system library export addresses within the process address space for the binary executable file with the security monitoring stub addresses to the security payload comprises locating a base address to a system library within the process address space for the binary executable file, the system library encompassing the system resources,
and wherein attaching the security payload to the binary executable file comprises:
increasing a number of sections value of the binary executable file to accommodate the security security payload embedded within the binary executable file;
creating a new section header for the security pa load and adding the new section header to header information of the binary executable file; and
adding the security payload to the binary executable file.

11. The computer-readable data storage medium of claim 10, wherein the process address space directing the call to the given API back to the security payload via one of the security monitoring stub addresses that is associated with the given API comprises the call to the given API resolving to one of the security monitoring stub addresses that is associated with the given API, such that control passes to the security payload.

12. The computer-readable data storage medium of claim 10, wherein the method further comprises, upon the binary executable file issuing the call to the given API:
upon the binary executable file issuing a call to a given API, the process address space directing the call to the given API back to the security payload via one of the security monitoring stub addresses that is associated with the given API; and,
the security payload assessing whether the call to the given API is a security breach.

13. The computer-readable data storage medium of claim 10, wherein attaching the security payload to the binary executable file is such that the binary executable file remains a valid binary executable file that is capable of being executed even after the security payload has been attached to the binary executable file.

14. The computer-readable data storage medium of claim 10, wherein attaching the security payload to the binary executable file further comprises initially mapping the binary executable file to virtual memory of a system in relation to which the method is performed.

15. The computer-readable data storage medium of claim 10, wherein the security payload replacing the system library export addresses within the process address space for the binary executable file with the security monitoring stub addresses to the security payload further comprises:

acquiring an address of the process address space for the binary executable file;

from the base address to the system library, locating addresses the for the API's within the system library;

copying the addresses for the API's within the system library to the security payload; and, replacing addresses for API's within the system library with the security monitoring stub addresses to the security payload.

16. A system comprising:

hardware comprising at least one or more of processors, memory, and storage devices;

an application running on the hardware and adapted to receive a binary executable file;

a plug-in for the application, the plug-in running on the hardware and adapted to attach security payload to the binary executable computer file, the security payload adapted to intercept application programming interface (API) calls to system resources from the binary executable file via export address redirection back to the security payload, such that upon execution of the binary executable file, the security payload replaces system library export addresses within a process address space for the binary executable file with security monitoring stub addresses to the security payload, the API calls associated with the system library export addresses within the process address space, wherein the plug-in attaches the security payload to the binary executable computer file at least by:

changing an address entry point of the binary executable file so that the security payload is executed first upon execution of the binary executable file;

increasing a number of sections value of the binary executable file to accommodate the security security payload embedded within the binary executable file;

creating a new section header for the security payload and adding the new section header to header information of the binary executable file; and adding the security payload to the binary executable file.

17. The system of claim 16, wherein, upon the binary executable file issuing a call to a given API, the process address space directs the call to the given API back to the security payload via one of the security monitoring stub addresses that is associated with the given API;

the security payload assesses whether the call to the given API is a security breach;

where the call to the given API is not a security breach, the security payload passes through the call to the given API to the system resources; and, where the call to the given API is a security breach, the security payload performs one or more security breach-related actions.

18. The system of claim 16, wherein the security payload replaces the system library export addresses within the process address space for the binary executable file with the security monitoring stub addresses to the security payload by:

acquiring an address of the process address space for the binary executable file;

locating a base address to a system library within the process address space for the binary executable file, the system library encompassing the system resources;

from the base address to the system library, locating addresses for API's within the system library;

copying the addresses for the API's within the system library to the security payload; and, replacing the addresses for the API's within the system library with the security monitoring stub addresses to the security payload.

* * * * *